(12) United States Patent
Browder et al.

(10) Patent No.: US 12,512,216 B1
(45) Date of Patent: Dec. 30, 2025

(54) APPARATUS AND METHOD FOR DETERMINING A CODE AS A FUNCTION OF SUBJECT DATA

(71) Applicant: Signet Health Corporation, North Richland Hills, TX (US)

(72) Inventors: Blake Browder, Dallas, TX (US); Joy Figarsky, Little Rock, AR (US)

(73) Assignee: Behavioral Health Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,811

(22) Filed: Nov. 24, 2024

(51) Int. Cl.
*G16H 40/20* (2018.01)
*G16H 50/20* (2018.01)

(52) U.S. Cl.
CPC ............. *G16H 40/20* (2018.01); *G16H 50/20* (2018.01)

(58) Field of Classification Search
CPC .............................. G16H 40/20; G16H 50/20
See application file for complete search history.

(56) References Cited

U.S. PATENT DOCUMENTS

| | | | |
|---|---|---|---|
| 6,915,254 B1 * | 7/2005 | Heinze | G06Q 10/10 707/E17.058 |
| 10,275,576 B2 * | 4/2019 | Furst | G06F 40/232 |
| 10,949,602 B2 * | 3/2021 | Snider | G10L 15/26 |
| 11,288,445 B2 * | 3/2022 | Burns | G16H 70/20 |
| 2015/0370979 A1 * | 12/2015 | Boloor | G16H 15/00 705/3 |
| 2016/0125168 A1 * | 5/2016 | Aagesen | G16H 10/60 705/3 |
| 2017/0235885 A1 * | 8/2017 | Cox | G06Q 10/10 705/2 |
| 2018/0081859 A1 * | 3/2018 | Snider | G06F 40/44 |
| 2021/0407685 A1 * | 12/2021 | Stockwell | G16H 50/50 |
| 2023/0215523 A1 * | 7/2023 | Sukhtipyaroge | G16H 50/70 705/3 |
| 2023/0386646 A1 * | 11/2023 | Tanwani | G06V 10/806 |
| 2023/0402158 A1 * | 12/2023 | Zavesky | G16H 10/40 |
| 2024/0202462 A1 * | 6/2024 | Kim | G06F 40/284 |

OTHER PUBLICATIONS

Pei-Fu Chen et al, Automatic ICD-10 Coding and Training System: Deep Neural Network Based on Supervised Learning, JMIR Med Inform. Aug. 31, 2021;9(8).

Xiaolin Diao et al, Automated ICD coding for primary diagnosis via clinically interpretable machine learning, "International Journal of Medical InformaticsVolume 153, Sep. 2021, 104543".

Krishanu Das Baksi et al, MedCodER: A Generative AI Assistant for Medical Coding, arXiv:2409.15368v1 [cs. CL] Sep. 18, 2024.

* cited by examiner

*Primary Examiner* — Jay M. Patel
(74) *Attorney, Agent, or Firm* — Caldwell Intellectual Property Law

(57) ABSTRACT

An apparatus and method for determining a code as a function of subject data. The apparatus includes at least a processor and a memory communicatively connected to the at least a processor. The memory instructs the processor to collect subject data, receive user input associated with the subject data, determine, using a first encoder, portions of the user input, wherein the portions comprise tokens and noise, identify, using a second encoder, the tokens of the portions, assign, using the second encoder, a code to the tokens, and identifying the code as a function of the subject data, and display the code.

20 Claims, 7 Drawing Sheets

APPARATUS AND METHOD FOR DETERMINING A CODE AS A FUNCTION OF SUBJECT DATA

FIELD OF THE INVENTION

The present invention generally relates to the field of coding. In particular, the present invention is directed to an apparatus and a method for determining a code as a function of subject data.

BACKGROUND

Traditional methods for encoding subject data typically rely on a single encoder or a fixed algorithm to generate codes. However, these approaches often prove inadequate when confronted with complex datasets or when the subject data varies in format, nature, or context. For example, in systems where the subject data comes from multiple inputs or dynamic sources, a single encoder may lack the flexibility to accommodate diverse data structures, resulting in inefficiencies or inaccuracies in the coding process. Additionally, many such systems require real-time code generation and decision-making, further complicating the use of traditional methods.

SUMMARY OF THE DISCLOSURE

In an aspect, an apparatus for determining a code as a function of subject data includes at least a processor and a memory communicatively connected to the at least a processor. The memory contains instructions configuring the processor to collect, using the at least a processor, subject data, receive, using the at least a processor, user input associated with the subject data, determine, using a first encoder, portions of the user input, wherein the portions comprise tokens and noise, identify, using a second encoder, the tokens of the portions, wherein identifying the tokens comprises extracting a context datum from the portions, comparing segments of the portions to predefined data, and filtering the noise from the portions as a function of a comparison of the segments to the predefined data, assign, using the second encoder, a code to the tokens, wherein assigning the code comprises determining at least a classification for the tokens, matching, using at least a reference database, the tokens to one or more codes associated with the at least a reference database, and identifying the code as a function of the subject data, and display, using a downstream device, the code.

In another aspect, a method for determining a code as a function of subject data includes collecting, using at least a processor, subject data, receiving, using the at least a processor, user input associated with the subject data, determining, using a first encoder, portions of the user input, wherein the portions comprise tokens and noise, identifying, using a second encoder, the tokens of the portions, wherein identifying the tokens comprises extracting a context datum from the portions, comparing segments of the portions to predefined data, and filtering the noise from the portions as a function of a comparison of the segments to the predefined data, assigning, using the second encoder, a code to the tokens, wherein assigning the code comprises determining at least a classification for the tokens, matching, using at least a reference database, the tokens to one or more codes associated with the at least a reference database, and identifying the code as a function of the subject data, and displaying, using a downstream device, the code.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a code as a function of subject data. The apparatus includes at least a computing device comprised of a processor and a memory communicatively connected to the processor. The memory instructs the processor to collect, using the at least a processor, subject data. The processor receives, using the at least a processor, user input associated with the subject data. The processor determines, using a first encoder, portions of the user input, wherein the portions comprise tokens and noise. Additionally, the processor identifies, using a second encoder, the tokens of the portions, wherein identifying the tokens comprises extracting a context datum from the portions, comparing segments of the portions to predefined data, and filtering the noise from the portions as a function of a comparison of the segments to the predefined data. The memory then instructs the processor to assign, using the second encoder, a code to the tokens, wherein assigning the code comprises determining at least a classification for the tokens, matching, using at least a reference database, the tokens to one or more codes associated with the at least a reference database, and identifying the code as a function of the subject data. The processor displays, using a downstream device, the code.

Figure 1:
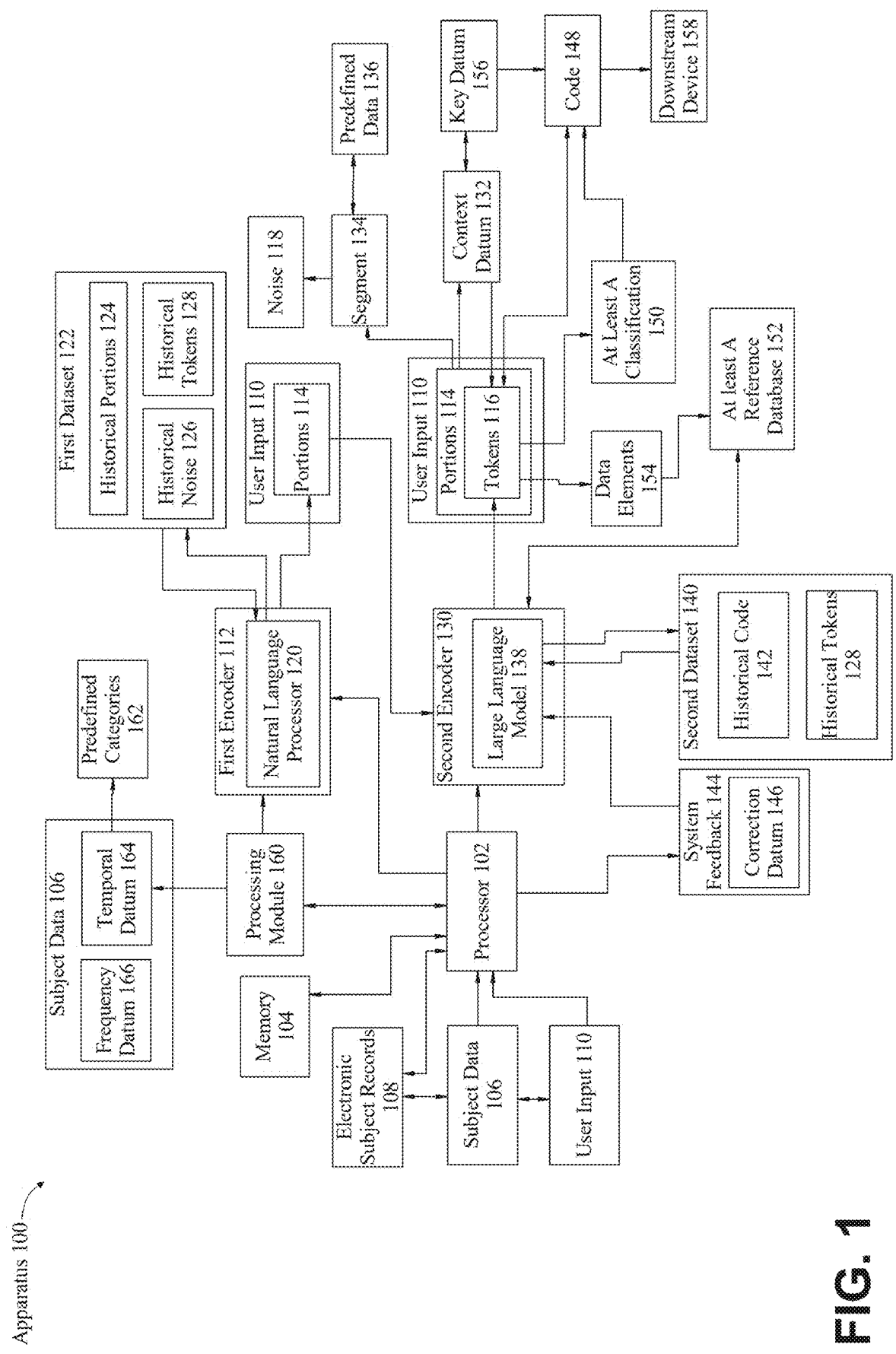
FIG. 1 is a block diagram of an apparatus for determining a code as a function of subject data.

Referring now to FIG. 1, an exemplary embodiment of apparatus 100 for determining a code as a function of subject data is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to collect subject data 106. As used in this disclosure, "subject data" is data associated with the individual or entity being analyzed. Without limitation, a subject may include a patient. In a non-limiting example, subject data 106 may be collected for processing to determine codes or classifications. In a non-limiting example, subject data 106 may include a patient's demographic details, such as age, gender, and medical history, which are used to determine the most relevant diagnostic codes. Another example of subject data 106 could be sensor data collected from wearable devices tracking a user's heart rate, physical activity, and sleep patterns to identify potential health risks. Subject data 106 may also refer to behavioral data captured from user interactions on a website, such as page views and click-through rates, which can be used to personalize content recommendations.

With continued reference to FIG. 1, in a non-limiting example, subject data 106 may include doctor's notes, diagnosis, medical records, and the like. In another non-limiting example, subject data 106 may include doctor's notes, diagnosis, medical records, and the like. For instance, without limitation, doctor's notes may capture a physician's observations, patient symptoms, recommended treatments, follow-up instructions from a consultation, and the like. Diagnosis data may include the specific medical condition identified during the patient's examination, such as a diagnosis of diabetes or hypertension, along with supporting evidence from tests or screenings. Medical records may include a wide array of information, including a patient's complete medical history, laboratory results, imaging studies (e.g., X-rays, MRIs), prescribed medications, surgical history, allergy information, and immunization status. Additionally and or alternatively, subject data 106 may include patient-reported outcomes, such as surveys detailing a patient's quality of life or pain levels, as well as real-time monitoring data from wearable devices tracking vitals like heart rate, blood pressure, and physical activity. Continuing, this comprehensive collection of subject data 106 may provide a holistic view of a patient's health, enabling accurate diagnosis, effective treatment planning, and improved care coordination among healthcare providers.

With continued reference to FIG. 1, the apparatus may be further configured to collect the subject data 106 from electronic subject records 108. As used in this disclosure, "electronic subject records" are digital records that contain health-related data for an individual. In a non-limiting example, the electronic subject records 108 may be used as a source of subject data 106. In a non-limiting example, an electronic health record may contain a patient's history of allergies, medications, immunization records, and the like, which are accessible to multiple healthcare providers for coordinated care. Without limitation, the electronic subject records 108 may include diagnostic imaging results, such as X-rays or MRIs, allowing specialists to review and provide recommendations remotely. In another example, without limitation, the electronic subject records 108 may integrate data from multiple sources, including primary care, specialist visits, and emergency room encounters, and the like.

Still referring to FIG. 1, processor 102 is configured to receive user input 110 associated with the subject data 106. As used in this disclosure, a "user input" is data that is input by a user into an electronic system. In some embodiments, user input 110 may include data or configurations of data that a user defines through a graphical user interface. Without limitation, user input 110 may include textual data. As used in this disclosure, "textual data" is data in the form of text or characters. For example, textual data may include text or characters in a human-readable format. Textual data may include letters, numbers, symbols, or combinations thereof. Textual data may be input, processed, stored, or transmitted by apparatus 100. In a non-limiting example, user input 110 may include direct interactions like typing into text fields, selecting options from dropdown menus, clicking on buttons, and/or interacting with other visual elements such as sliders, icons, and/or checkboxes. Additionally and or alternatively, user input 110 may include multi-step inputs involving combinations of selections, adjustments of settings, and/or the customization of data parameters. In another non-limiting example, user input 110 may directly influence how the apparatus processes, displays, and/or manipulates data in real-time.

With continued reference to FIG. 1, for example, in a non-limiting example, user input 110 may consist of text typed into a search bar by a user looking for specific health information, such as "symptoms of diabetes." In another non-limiting example user input 110 may include voice commands given to a virtual assistant to schedule an appointment or retrieve information from an EHR. Continuing, without limitation, user input 110 may also involve selecting options from a dropdown menu on the graphical user interface to filter search results, such as choosing a preferred language or sorting results by date.

Still referring to FIG. 1, processor 102 is configured to determine, using a first encoder 112, portions 114 of the user input 110, wherein the portions 114 include tokens 116 and noise 118. As used in this disclosure, an "encoder" is a component, algorithm, or system that transforms input data into a structured or different representation. In a non-limiting example, an encoder may analyze a large body of text and assign higher weights to words, phrases, or tokens 116 that are considered more important based on context. For instance, without limitation, an encoder may process patient records and classify key elements like diagnoses, symptoms, and medication names as important, while disregarding less relevant details, such as filler text or conversational phrases. In a non-limiting example, an encoder may be applied to electronic subject records 108 to automatically classify important clinical data, such as diagnoses, lab results, or patient symptoms, while deprioritizing less significant information like appointment scheduling details or routine check-in notes. For example, if a patient has multiple EHR entries, the encoder may highlight critical changes in their condition, such as a new diagnosis of hypertension, and downplay routine observations like stable vitals from previous visits. In another non-limiting example an encoder may automatically extract key clinical information like "chest pain" or "shortness of breath" while classifying administrative details (e.g., "patient was seen on time") as less relevant. Continuing, this type of filtering may be useful for generating summaries or alerts for physicians who need to quickly identify critical aspects of a patient's condition.

With continued reference to FIG. 1, as used in this disclosure, "first encoder" is an initial component that processes user input 110 to determine portions 114. As used in this disclosure, "portions" are segments or parts of the user input 110 that are analyzed by the encoders. In a non-limiting example, portions 114 may contain both meaningful elements (tokens 116) and irrelevant data (noise 118). In a non-limiting example, portions 114 could refer to different segments 134 of a text document, such as paragraphs or sentences, which are analyzed individually for content categorization. As used in this disclosure, a "token" is distinct data element or meaningful segment extracted from the user input 110. In a non-limiting example, the token may represent key information for further processing. In a non-limiting example, a token may refer to a word in a sentence that is used for natural language processing tasks like text classification. In a non-limiting example, the apparatus may utilize tokenization algorithms. As used in this disclosure, "tokenization algorithms" are computational processes that segment data into meaningful, discrete elements or tokens. In a non-limiting example, the tokenization algorithms may systematically break down text or other data into smaller units, which May include words, subwords, sentences, or characters, depending on the application and requirements. Continuing, the tokenization algorithms may help convert raw data into structured, analyzable formats. Without limitation, the tokenization algorithm may include Byte-Pair Encoding (BPE), WordPiece, SentencePiece, and the like. In a non-limiting example, BPE may tokenize text by merging the most frequent pairs of characters, progressively creating longer tokens that represent common subwords or phrases. Continuing, the BPE approach may be effective in reducing vocabulary size while retaining essential semantic information. In another non-limiting example, WordPiece may split words into subword units, using a predefined vocabulary and a likelihood function to retain meaningful subword tokens while reducing the need for a large vocabulary. Without limitation, SentencePiece may extend subword tokenization by handling entire sentences, treating them as sequences of subword units. Continuing, SentencePiece may tokenize any script or language without requiring spaces as delimiters. In a non-limiting example, the apparatus may utilize one or more tokenization algorithms. Without limitation, the tokenization algorithm may convert sensitive patient data and specific medical terms into tokens 116 that can be securely stored and easily referenced, without exposing original information. For example, if a healthcare provider's system needs to store sensitive patient identifiers such as the patient's name, Social Security number, and medical record number, alongside coded diagnoses, one or more tokenization algorithms may be applied. For instance, the applied tokenization algorithm, may replace the patient's sensitive information with a tokenized ID, such as "PAT_102345." Continuing, the token 116 may hold no direct link to the actual patient identifier, ensuring that if the database is compromised, no patient information can be readily accessed. Continuing, the tokenized ID may link to the original data only within a secure, access-controlled environment. In another non-limiting example, for a patient's name "John Smith" and Social Security number "123-45-6789," a tokenization algorithm may generate unique tokens, like "JSM123" or "PATID_0001." Continuing, billing departments may process the tokens for reimbursement or insurance purposes and may not have access to the patient's sensitive information but may use the tokens as consistent, anonymized references.

With continued reference to FIG. 1, in another non-limiting example, the tokenization algorithms may help the natural language processor 120 with extracting and analyzing diagnoses or treatment information. For instance, the apparatus may tokenize complex medical diagnoses into discrete elements, such as the NLP 120 may break down "Type 2 Diabetes Mellitus with Hyperglycemia" into tokens representing different elements: ['Type_2', 'Diabetes', 'Mellitus', 'Hyperglycemia']. Continuing, BPE or WordPiece algorithms may be used to segment these terms for precise analysis, making it possible to conduct searches or classifications on a vast amount of records while retaining accurate medical semantics.

With continued reference to FIG. 1, as used in this disclosure, "noise" is unwanted or extraneous data in an input that does not contribute meaningfully to the desired output. In a non-limiting example, the noise 118 may need to be filtered out. In a non-limiting example, noise 118 may consist of irrelevant data in an audio signal, such as background sounds during a speech recognition task. In another non-limiting example, in text processing, noise 118 may include extraneous words or formatting symbols that do not contribute to the semantic meaning and should be removed during preprocessing.

With continued reference to FIG. 1, the first encoder 112 may include a natural language processor 120 trained using a first dataset 122 including historical portions 124 corresponding to historical noise 126 and historical tokens 128. As used in this disclosure, "natural language processor" is a processing unit trained to understand and process human language. In a non-limiting example, the natural language processor 120 may transform the user input 110 into structured data such as portions 114. In a non-limiting example, a natural language processor 120 may extract key medical terms from clinical notes to automatically generate patient summaries. As used in this disclosure, a "first dataset" is a set of data used to train the first encoder 112. In a non-limiting example, the first dataset 122 may include historical data such as historical tokens 128 and historical noise 126 from prior user input 110. As used in this disclosure, "historical portions" are previous segments of user input 110 that have been recorded and used for training the first encoder 112. In a non-limiting example, the historical portions 124 may contain both historical tokens 128 and historical noise 126. In a non-limiting example, historical portions 124 may include past data segments from patient medical records, used to analyze treatment outcomes over time. As used in this disclosure, "historical noise" are unimportant or irrelevant data that has been previously identified. Without limitation, the historical noise 126 may be used for training the first encoder 112 to improve noise filtering. In a non-limiting example, historical noise 126 may refer to outdated or irrelevant entries in a dataset, such as old medical records that no longer reflect a patient's current health status. In another non-limiting example, the historical noise 126 may also include typographical errors in the user input 110 that distorts the true meaning and needs to be filtered out during preprocessing. As used in this disclosure, "historical tokens" are meaningful data elements from past user input 110. In a non-limiting example, the historical tokens 128 may be used in training an encoder to recognize similar elements in future user input 110. For example, historical tokens 128 may be used to train the first encoder 112. In a non-limiting example, historical tokens 128 may consist of words frequently appearing in past medical records.

Still referring to FIG. 1, processor 102 is configured to identify, using a second encoder 130, the tokens 116 of the portions 114, wherein identifying the tokens 116 include extracting a context datum 132 from the portions 114, comparing segments 134 of the portions 114 to predefined data 136, and filtering the noise 118 from the portions 114 as a function of a comparison of the segments 134 to the predefined data 136. As used in this disclosure, "second encoder" is a subsequent processing unit used for analyzing the portions 114. In a non-limiting example, the second encoder 130 may include a large language model 138. In another non-limiting example, the second encoder 130 may analyze the portions 114 identified by the first encoder 112 to determine tokens 116 for assigning codes or classifications. In a non-limiting example, the second encoder 130 might refine the data representation created by the first encoder 112 by applying more complex transformations, such as context-aware adjustments in text processing. As used in this disclosure, a "context datum" is a piece of information extracted from the input that provides context to the portions 114. Continuing, the additional context may aid the second encoder 130 in more accurate code 148 determination. In a non-limiting example, the context datum 132 may include metadata about when and where a particular data entry was made. Continuing, this information may help to provide a deeper understanding of the data's relevance. As used in this disclosure, "segments" are parts or subdivisions of the user input 110 used for comparison to predefined data 136 during processing. In a non-limiting example, segments 134 may include distinct time intervals in an audio recording, such as spoken phrases that are analyzed separately for speech recognition. In another non-limiting example, segments 134 may include frames of a video which may be divided for processing and identification of specific objects or events. Without limitation, segments 134 may refer to parts of a written document, such as paragraphs, phrases, words, and the like, that are processed individually to identify themes or topics. As used in this disclosure, "predefined data" is reference information or data against which segments 134 are compared. In a non-limiting example, the predefined data 136 may be stored in a reference database 152. In a non-limiting example, the predefined data 136 may include a list of standardized medical codes used to categorize patient diagnoses and treatments.

With continued reference to FIG. 1, the apparatus may include cross-encoders. As used in this disclosure, a "cross-encoder" is a neural network architecture designed to evaluate the relationship or similarity between two inputs by jointly encoding them. In a non-limiting example, cross-encoders may enhance the ability of apparatus 100 to analyze and filter data by comparing user input 110 to predefined data 136. Continuing, using a cross-encoder approach may enable the apparatus 100 to assess whether a token 116 from the user input 110 matches or aligns closely with predefined data 136, such as codes 148 in the reference database 152. Without limitation, the cross-encoder may operate by taking both inputs simultaneously, encoding their combined context and producing a similarity score or relevance measure. Continuing, the joint encoding may allow the apparatus to identify noise 118 by comparing the encoded segment's context to the reference database 152; if a segment 134 scores low in similarity, it may be classified as noise 118 and filtered out. Continuing, cross-encoders may be useful for this type of application as it may require high contextual understanding, as the model considers the inputs together rather than separately, enhancing accuracy in identifying meaningful data elements and disregarding irrelevant information.

With continued reference to FIG. 1, wherein the second encoder 130 may include a large language model 138 trained using a second dataset 140 comprising historical tokens 128 corresponding to historical code 142. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, nonlimiting examples, medical report documents, electronic subject records, entity documents, business documents, inventory documentation, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "I am feeling", then it may be highly likely that the word "happy" or "sad" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not be conditioned to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As nonlimiting examples, user device may include desktops, laptops, smartphones, tablets, and the like. In some embodiments, input may include any set of data associated with user input 110.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, as used in this disclosure, "second dataset" is data used to train the second encoder 130. In a non-limiting example, the second dataset 140 may include historical tokens 128 and corresponding historical codes 142. In another non-limiting example, the second dataset 140 may include real-time data collected after deployment, used to continuously update and improve model performance. As used in this disclosure, "historical code" is previously determined codes associated with historical tokens 128, used for training the second encoder 130. In a non-limiting example, the historical code 142 associated with the historical tokens 128 may permit the second encoder 130 to identify similar patterns in new input and thereby achieve the optimal code required for the specific patient.

With continued reference to FIG. 1, the second encoder 130 may be iteratively trained using system feedback 144. As used in this disclosure, "system feedback" is information provided to the system that helps refine the processing algorithms. In a non-limiting example, the system feedback 144 may be based on user input 110 corrections or system corrections. In a non-limiting example, system feedback 144 may include error messages or alerts generated when the system encounters unexpected conditions, guiding corrective actions. In another non-limiting example, the system feedback 144 may include user interactions with a user interface, where the system learns from the corrections made by users to improve future performance. Without limitation, the system feedback 144 may include periodic reviews of model predictions, where human evaluators provide input to fine-tune the algorithm.

With continued reference to FIG. 1, the system feedback 144 may include a correction datum 146 based on the user input 110. As used in this disclosure, "correction datum" is data used to adjust the processing algorithms. In a non-limiting example, the correction datum 146 may be derived from correcting errors in initial outputs, such as the code 148. In a non-limiting example, the correction datum 146 may involve manual edits made to the code 148 predicted by the large language model 138, serving as training data for future accuracy improvement. Without limitation, correction datum 146 may also be the revised labels assigned to a dataset during quality control checks, improving data integrity.

Still referring to FIG. 1, processor 102 is configured to assign, using the second encoder 130, a code 148 to the tokens 116, wherein assigning the code 148 comprises determining at least a classification 150 for the tokens 116, matching, using at least a reference database 152, the tokens 116 to one or more codes associated with the at least a reference database 152, and identifying the code 148 as a function of the subject data 106. As used in this disclosure, "code" is an output classification or label assigned to tokens 116 based on their context and comparison to reference data. In a non-limiting example, code 148 may refer to a sequence of alphanumeric characters used to represent a condition in records.

With continued reference to FIG. 1, the code 148 may include medical code. As used in this disclosure, a "medical code" is a standardized alphanumeric string that is used to identify and classify specific medical diagnoses, procedures, equipment, and services. Without limitation, medical codes may be widely used in healthcare for billing, documentation, research, data analysis, and the like. Continuing, medical codes may permit uniform communication between healthcare providers, insurance companies, government entities, and the like. For example, without limitation, medical codes may include the International Classification of Diseases (ICD) for diagnoses, Current Procedural Terminology (CPT) for medical procedures, Healthcare Common Procedure Coding System (HCPCS) for services and equipment, such as durable medical equipment, and the like.

With continued reference to FIG. 1, the apparatus 100 may be further configured to assign the code 148 based on a hierarchical system. As used in this disclosure, a "hierarchical system" is an organized structure in which elements or data are arranged in levels or tiers based on their relationship or specificity. Without limitation, the hierarchical system may organize each level of the data to represent a degree of categorization, where broader, more general categories are placed at higher levels, and progressively specific subcategories are organized beneath them, or subsequent to them in a sequence, in a descending order. Without limitation, the hierarchical system may generate hierarchical code. In a non-limiting example, a "hierarchical code" is a code that includes a series of alphanumeric characters where each character group represents an increasingly specific category. For example, without limitation, the hierarchical code may include initial characters denoting a broad category, and subsequent characters denoting a refined classification to a more specific diagnosis. In another non-limiting example, the hierarchical code may allow for dynamic classification where tokens 116 extracted from user input 110 may be mapped to the closest matching code 148.

With continued reference to FIG. 1, the hierarchical system may be configured to generate a probability score as a function of a confidence datum. As used herein, a "probability score" is a numerical value that represents the confidence of the apparatus in the selected code's accuracy. As used in this disclosure, a "confidence datum" is a metric or value that represents the level of certainty or reliability in a particular assignment, classification, or prediction made by a system or algorithm. Continuing, the confidence datum value may be calculated as a probability score or percentage that quantifies how strongly the apparatus 100 believes that a given output, such as a classification 150 or the code 148, correctly matches the input data. For instance, without limitation, the apparatus 100 may assign a high probability score to a specific code 148 to indicate that the token 116 aligns well with the determined classification 150. However, if the probability score falls below a predefined threshold, the apparatus 100 may assign a broader, more general code 148, to improve the accuracy of classification 150 and avoid overly specific codes when the confidence score is low. In a non-limiting example, the hierarchical code may be transmitted to a downstream device 158 through a user interface. Continuing, the user interface may prompt users to review or complete the code 148 if desired. For example, without limitation, if a diagnosis initially aligns more broadly with "Diabetes Mellitus" but receives a low probability score for "Type 2 Diabetes Mellitus with Hyperglycemia," the user interface may prompt the user to confirm or specify the exact type or complication to ensure proper coding of the data. In a non-limiting example, presenting the code 148 with a low probability score to the user may help streamline the coding process, enhance data accuracy, and facilitate efficient navigation of medical code hierarchies.

With continued reference to FIG. 1, as used in this disclosure, a "classification" is the process of categorizing a token according to a predefined set of categories. In a non-limiting example, classification 150 could involve sorting patient data into different risk categories based on health indicators. For example, without limitation, the classification 150 may include categorizing documents into predefined topics for easier retrieval in a document management system. As used in this disclosure, "reference database" is a data repository that stores predefined data, codes, or classifications used for matching during processing. In a non-limiting example, a reference database 152 may contain standardized medical terminologies used for consistent coding across healthcare providers. For instance, without limitation, the reference database 152 may include the primary medical code libraries such as International Classification of Diseases, 10th Revision, Clinical Modification (ICD-10-CM), Current Procedural Terminology (CPT), Healthcare Common Procedure Coding System (HCPCS), Logical Observation Identifiers Names and Codes (LOINC), and Systematized Nomenclature of Medicine-Clinical Terms (SNOMED CT). Without limitation, the ICD-10-CM is a system used by healthcare providers to classify and code 148 all diagnoses, symptoms, and procedures recorded in conjunction with hospital care in the United States. This code library is essential for maintaining a consistent language in healthcare reporting and allows healthcare providers and payers to communicate diagnoses and medical conditions efficiently. Without limitation, the CPT is maintained by the American Medical Association (AMA) and consists of standardized codes used to describe medical, surgical, and diagnostic services. These codes allow healthcare professionals to communicate uniform information about medical services and procedures across different systems, making it critical for insurance billing and medical recordkeeping. Continuing, the HCPCS is a standardized coding system that includes both CPT codes and additional codes not covered by CPT, such as codes for medical equipment, prosthetics, and other medical supplies. The system is divided into two levels: Level I corresponds to CPT codes, and Level II covers equipment, devices, and services not included in the CPT library. HCPCS is heavily used for Medicare and Medicaid claims. Continuing, the LOINC is a universal coding system for identifying health measurements, observations, and documents. It plays a crucial role in the exchange of clinical information, particularly in laboratory and diagnostic testing, ensuring that test results and clinical observations are communicated in a standardized way across different healthcare settings. Without limitation, SNOMED CT is a comprehensive, multilingual healthcare terminology system that covers a wide range of clinical healthcare data, including diseases, procedures, symptoms, and body functions. It is used globally to support the exchange of clinical data between healthcare providers, ensuring that clinical terms are represented uniformly across different healthcare environments and information systems.

With continued reference to FIG. 1, identifying tokens 116 of the user input 110 may include detecting data elements 154 that correspond to one or more codes associated with the at least a reference database 152. As used in this disclosure, "data elements" are individual units of data that carry specific meaning or value within a dataset. Continuing, data elements 154 may include discrete pieces of information, such as words, numbers, symbols, and/or other identifiable components, that may be processed, analyzed, or matched to codes associated with a reference database 152 to derive meaningful insights or classifications. For example, data elements 154 may include specific pieces of information related to healthcare, such as diagnoses, procedures, patient demographics, and the like, that are converted into standardized codes for consistency and accuracy in record-keeping and billing. In a non-limiting example, a diagnosis code may be assigned using the International Classification of Diseases (ICD). For instance, "Type 2 Diabetes Mellitus" may be coded as E11.9 under ICD-10. Continuing, a procedure code may be assigned using the Current Procedural Terminology (CPT) system, a data element like "Routine Blood Test" could be coded as CPT 85025. Without limitation, in pharmacy coding, a medication such as "Amoxicillin 500 mg" might be coded as NDC 68084-010 using the National Drug Code (NDC) system.

With continued reference to FIG. 1, the process of identifying tokens 116 within user input 110 may involve using NLP and pattern-recognition techniques, as discussed herein, to detect specific data elements 154 that correspond to one or more codes in the reference database 152. Without limitation, the apparatus may tokenize the user input 110, breaking it into discrete tokens 116 like words, phrases, numbers, and symbols relevant to a specific field, such as healthcare. For example, without limitation, a sentence containing "Type 2 Diabetes Mellitus" may be divided into tokens 116, allowing further processing to identify meaningful components. Without limitation, the NLP algorithm may analyze the context of each token 116 and interpret the meaning to ensure precise classification. Continuing, techniques like named entity recognition (NER) may tag important terms like "diabetes" or "blood test" as potential data elements 154. Continuing, once the tokens 116 are identified, the apparatus may match each one against codes within the reference database 152, which may include standards like ICD-10, CPT, or NDC. In a non-limiting example, a match found for "Type 2 Diabetes Mellitus" may be associated with the ICD-10 code E11.9 and assigned accordingly. Continuing, a probability score may also be generated to indicate how likely it is that the data element 154 accurately matches a specific code as discussed in more detail herein.

With continued reference to FIG. 1, identifying the code 148 as a function of the subject data 106 may include analyzing context data of the user input 110. In a non-limiting example, the user input 110 may include various data, such as a description of a patient's condition, a procedure performed, or medication prescribed. Continuing, the context data of the user input 110 may include the location of care, the physician's specialty, or additional patient information. Continuing, the context data may help refine and clarify the code 148 assignment. For instance, without limitation, if a healthcare provider inputs a description of a diagnosis like "diabetes," the context data can include whether the diabetes is type 1 or type 2, whether it is controlled or uncontrolled, and whether complications are present. Continuing, the second encoder 130 may analyze these elements to determine the specific ICD-10 code. In a non-limiting example, the user input 110 may include "Type 2 Diabetes Mellitus, uncontrolled" as a result of a subject visiting the office. Continuing, the context data may include patient history or lab results confirming that the diabetes is uncontrolled. Continuing, the second encoder 130 may analyze this data, cross-referencing it with available diagnosis codes, and assigns the code E11.65 (ICD-10 for Type 2 diabetes mellitus with hyperglycemia). Similarly, without limitation, for a medical procedure, the user input 110 may include "Appendectomy" as the subject data 106. Continuing, the context data may include whether the procedure was performed laparoscopically or through open surgery, as well as whether complications were involved. Continuing, based on the user input 110 and the context data, the second encoder 130 may analyze the data and assign the appropriate CPT code, such as CPT 44970 for a laparoscopic appendectomy. Without limitation, in both cases, the second encoder 130 may identify the code 148 by analyzing not just the basic input (e.g., "diabetes" or "appendectomy") but also the surrounding context, such as specifics about the condition, method of treatment, or additional details provided by the user. Continuing, this may ensure that the code 148 assigned is as accurate and specific as possible, improving the reliability of medical records, billing processes, and statistical analyses.

With continued reference to FIG. 1, identifying the code 148 may further include comparing the context data of the user input 110 to key datum 156 of the subject data 106. As used in this disclosure, "key datum" is important data points that are used for comparing context data to identify or verify codes. In a non-limiting example, key datum 156 may include essential data points used for decision-making, such as vital signs indicating a patient's health status. Without limitation, a key datum 156 may reflect recent, critical, or contextually important aspects of a subject's medical condition or history, which may be necessary to accurately identify a diagnosis or treatment path. For example, without limitation, the key datum 156 may be, "The patient was diagnosed with Type 2 diabetes last week at age 35." This would be considered a key datum 156 because it is a recent and clinically important piece of information that may influence future care, treatment decisions, or coding for insurance and medical records. In contrast, less critical information, may include, "The patient received the Tdap vaccine when they were 10 years old." Although part of the patient's medical history, this is not immediately relevant to the current diagnosis or treatment and may not be considered a key datum 156 for purposes of identifying or assigning a specific medical code.

Still referring to FIG. 1, processor 102 is configured to display, using a downstream device 158, the code 148. As used in this disclosure, "downstream device" is a device that accesses and interacts with apparatus 100. For instance, and without limitation, downstream device 158 may include a remote device and/or apparatus 100. In a non-limiting embodiment, downstream device 158 may be consistent with a computing device as described in the entirety of this disclosure. Without limitation, the downstream device 158 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, the apparatus further include a processing module 160 configured to organize the subject data 106 into predefined categories 162 based on a temporal datum 164, and filter the subject data 106 based on a frequency datum 166. As used in this disclosure, "processing module" is a component that organizes and filters data, categorizing it into predefined groups based on specific criteria like time or frequency. In a non-limiting example, a processing module 160 may analyze sensor data to filter out noise 118 and identify meaningful patterns. Another example could involve a software module that transforms raw data into structured formats for storage in a database. A processing module 160 might also be used in machine learning workflows to prepare datasets for model training, such as normalizing values. As used in this disclosure, "predefined categories" are specific classifications or groups into which data is organized for processing purposes. In a non-limiting example, predefined categories 162 may be used in data classification tasks to sort text documents into topics such as "finance," "health," and "legal." Continuing, the criteria used to define these categories may be related to time, the nature of the data (e.g., medical conditions, symptoms, treatments), or other relevant factors. Without limitation, predefined categories 162 may include physical injuries, mental health issues, symptoms, medications, and the like. For instance, physical injuries may be a broad category that is further broken down into more specific subcategories, such as injuries related to the nervous system, head trauma, musculoskeletal injuries, etc. This allows healthcare providers to quickly reference all injuries a patient has sustained over their lifetime. In another non-limiting example, mental health issue category may focus on the patient's mental health conditions over a specific timeframe, such as the last three months. This may include diagnoses, treatments, and any changes in the patient's mental health during that period. Continuing, without limitation, the symptoms category may include the patient's symptoms over various time spans, such as days, weeks, months, or years. For example, a healthcare provider may want to track all symptoms reported over the past month to analyze the progression of a condition. Without limitation, the medications category may include medications a patient has been prescribed over a certain timeframe, such as the past six months, to monitor medication adherence, effectiveness, or possible side effects. As used in this disclosure, "temporal datum" is data related to time, used for organizing or filtering subject data 106. Without limitation, the temporal datum 164 may include specific dates, ranges of time, seconds, minutes, hours, and the like. In a non-limiting example, temporal datum 164 may refer to timestamps associated with data entries, indicating when they were recorded. Another example may involve date ranges used to analyze trends over time. As used in this disclosure, "frequency datum" is data related to the frequency of occurrences, utilized for filtering or organizing subject data 106. In a non-limiting example, frequency datum 166 may indicate how often a specific event occurs, such as the frequency of medical check-ups for a patient. Another example could involve tracking the number of clicks on a webpage over time, providing insights into user engagement. Frequency datum 166 might also refer to the rate at which errors occur in a manufacturing process, helping to identify areas for improvement. Without limitation, the apparatus 100 may organize the subject data 106 into predefined categories 162 based on the temporal datum 164 (such as days, months, or years), allowing for systematic tracking over time. Continuing, the apparatus may also filter the subject data 106 based on a frequency datum 166 (e.g., how often a symptom occurs), enabling the apparatus to prioritize or focus on the most frequently occurring or critical data for analysis.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
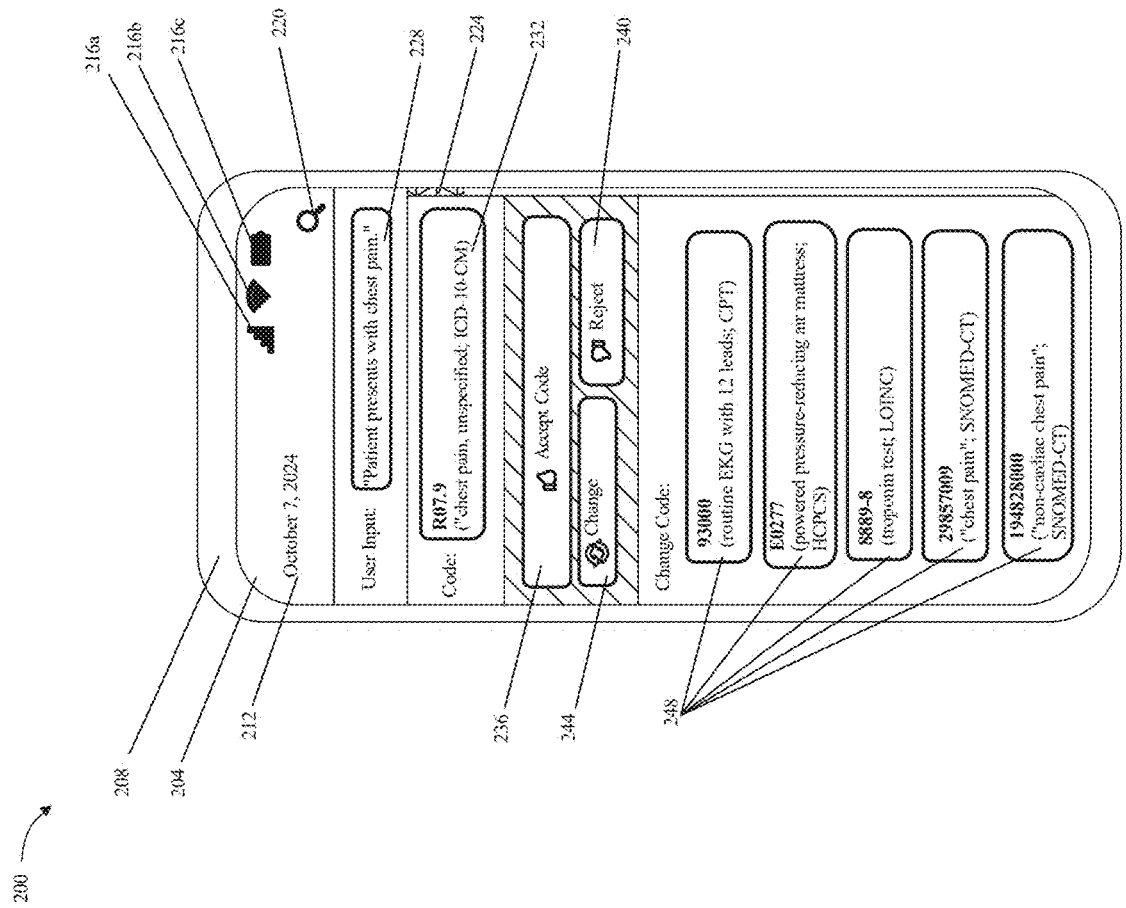
FIG. 2 is an exemplary illustration of a graphical user interface.

Referring now to FIG. 2, an exemplary illustration 200 of a graphical user interface. In an embodiment, the graphical user interface 204 may be displayed on a downstream device 208. In an embodiment, the graphical user interface 204 may include a heading portion 212. In an embodiment, the heading portion 212 may include the date, time, and the like. In an embodiment, the heading portion 212 may include icons 216*a-c*. In an embodiment, the icons 216*a-c* may include a signal strength icon 216*a*, a Wi-Fi icon 216*b*, a battery icon 216*c*, and the like. In an embodiment, the signal strength icon 216*a* displays the strength of the downstream device 208 connection to a mobile network. In an embodiment, the signal strength icon 216*a* may be depicted as a series of ascending bars, with more bars indicating a stronger signal. Continuing, the signal strength icon 216*a* may include no bars, representing that the downstream device 208 has little or no connection. In an embodiment, the Wi-Fi icon 216*b* may include a series of curved lines radiating upwards (like a fan or signal wave). In an embodiment, the Wi-Fi icon 216*b* may illustrate whether the downstream device 208 is connected to a Wi-Fi network and the strength of the connection. In an embodiment, the battery icon 216*c* the current battery level of the downstream device 208. In an embodiment, a fully shaded battery may indicate a full charge, while an empty battery icon may indicate that the battery is almost depleted. In an embodiment, battery icon 216*c* may include additional symbols such as a charging symbol (like a lightning bolt) when the phone is plugged in. In an embodiment, the heading portion 212 may include a search icon 220. In an embodiment, the search icon 220 may include a graphical symbol depicted as a magnifying glass. In an embodiment, the search icon 220 may be used in user interfaces to represent the functionality of searching or finding content. In an embodiment, the search icon 220 may be located in areas such as search bars, menus, or toolbars, and when interacted with (e.g., clicked or tapped), it initiates a search function, allowing users to input queries to find specific information or items within an application, website, or system.

In an embodiment, the graphical user interface 204 may include a scroll bar 224. In an embodiment, the scroll bar 224 may appear on the side of a code editing window, allowing the user to scroll through a long block of code or text to navigate more efficiently. In an embodiment, the graphical user interface 204 may include a user input field 228. In an embodiment, the user input field 228 may be present as a text box where users can enter user input. In an embodiment, the user input field 228 may include an observation from a doctor appointment such as, "Patient presents with chest pain." In an embodiment, the graphical user interface 204 may include a code prediction field 232. In an embodiment, the code prediction field 232 may include "R07.9 ("chest pain, unspecified; ICD-10-CM)" indicating the code R07.9 from the ICD-10-CM (International Classification of Diseases, 10th Revision, Clinical Modification) for "chest pain, unspecified." In an embodiment, the code prediction field 232 may display auto-suggested code snippets or functions based on the user's input, helping with auto-completion while writing code. In an embodiment, the graphical user interface 204 may include an "Accept Code" button 236. In an embodiment, the "Accept Code" button 236 may be placed below the code prediction field, allowing the user to select and confirm the suggested code snippet to define the user input. In an embodiment, the graphical user interface 204 may include a "Reject" button 240. In an embodiment, the "Reject" button 240 may be used to discard the current code suggestion or to cancel the action. In an embodiment, the graphical user interface 204 may include a "Change" button 244. In an embodiment, the "Change" button 244 may allow users to modify the current code suggestion, prompting the system to offer different variations of code snippets. In an embodiment, the graphical user interface 204 may include alternative code options 248. In an embodiment, alternative code options 248 may appear as a dropdown or side panel offering multiple code suggestions for the user to choose from. For example, without limitation, the alternative code options 248 may include "93000 (routine EKG with 12 leads; CPT)" indicating the code 93000 and the matched Current Procedural Terminology (CPT) code for a routine electrocardiogram (EKG) using 12 leads, "E0277 (powered pressure-reducing air mattress; HCPCS)" indicating the code E0277 from the Healthcare Common Procedure Coding System (HCPCS), which represents a powered pressure-reducing air mattress, "8889-8 (troponin test; LOINC)" indicating the code 8889-8 from the LOINC (Logical Observation Identifiers Names and Codes) for a troponin test, "29857009 ("chest pain"; SNOMED-CT)" indicating 29857009 from the SNOMED-CT (Systematized Nomenclature of Medicine—Clinical Terms) for "chest pain," and "194828000 ("non-cardiac chest pain"; SNOMED-CT)" indicating the code 194828000 from the SNOMED-CT code for "non-cardiac chest pain".

Figure 3:
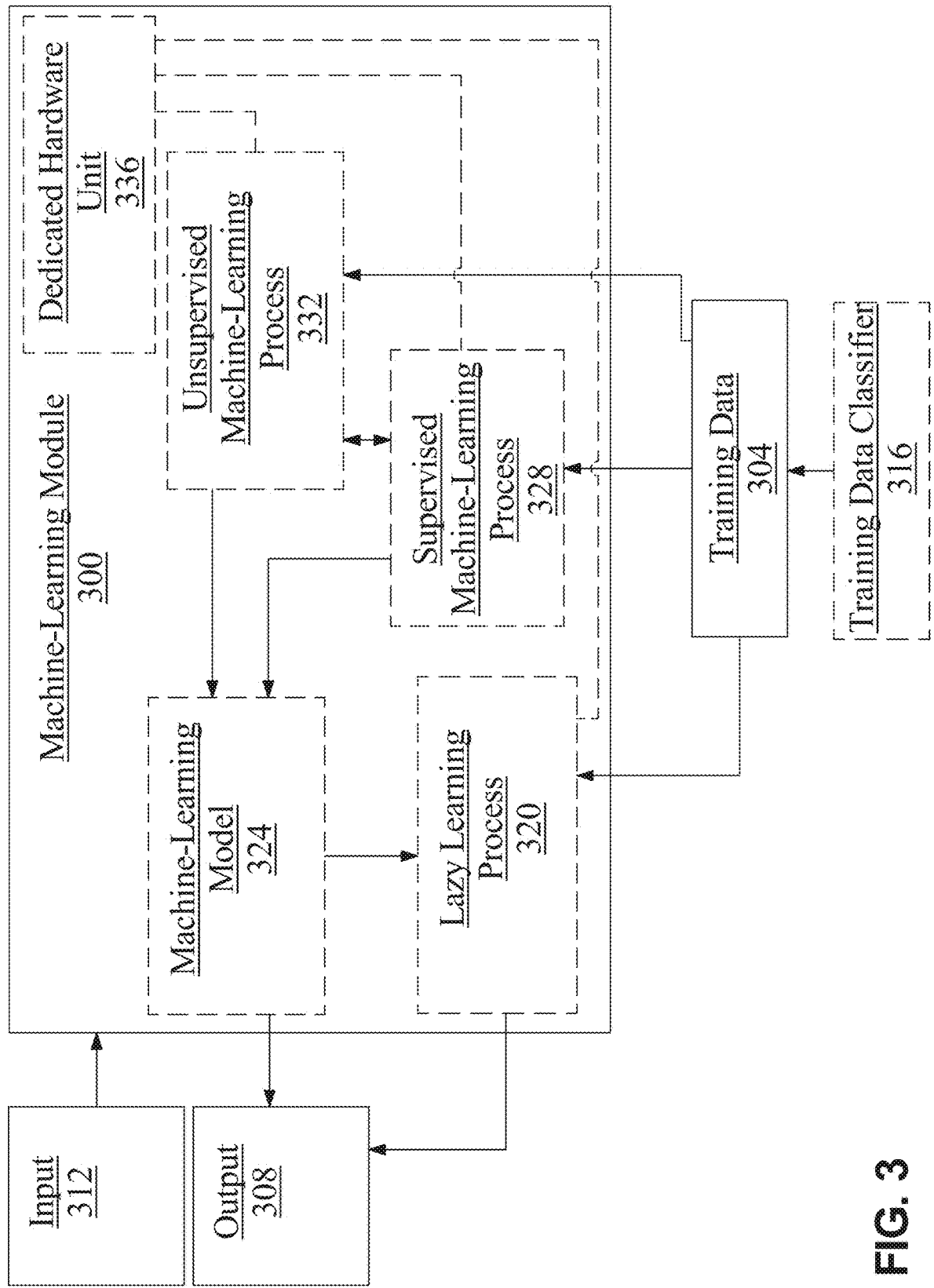
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include user input and outputs may include portions and/or tokens of the user input.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classify portions and tokens of the user input.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user input as described above as inputs, portions and tokens as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
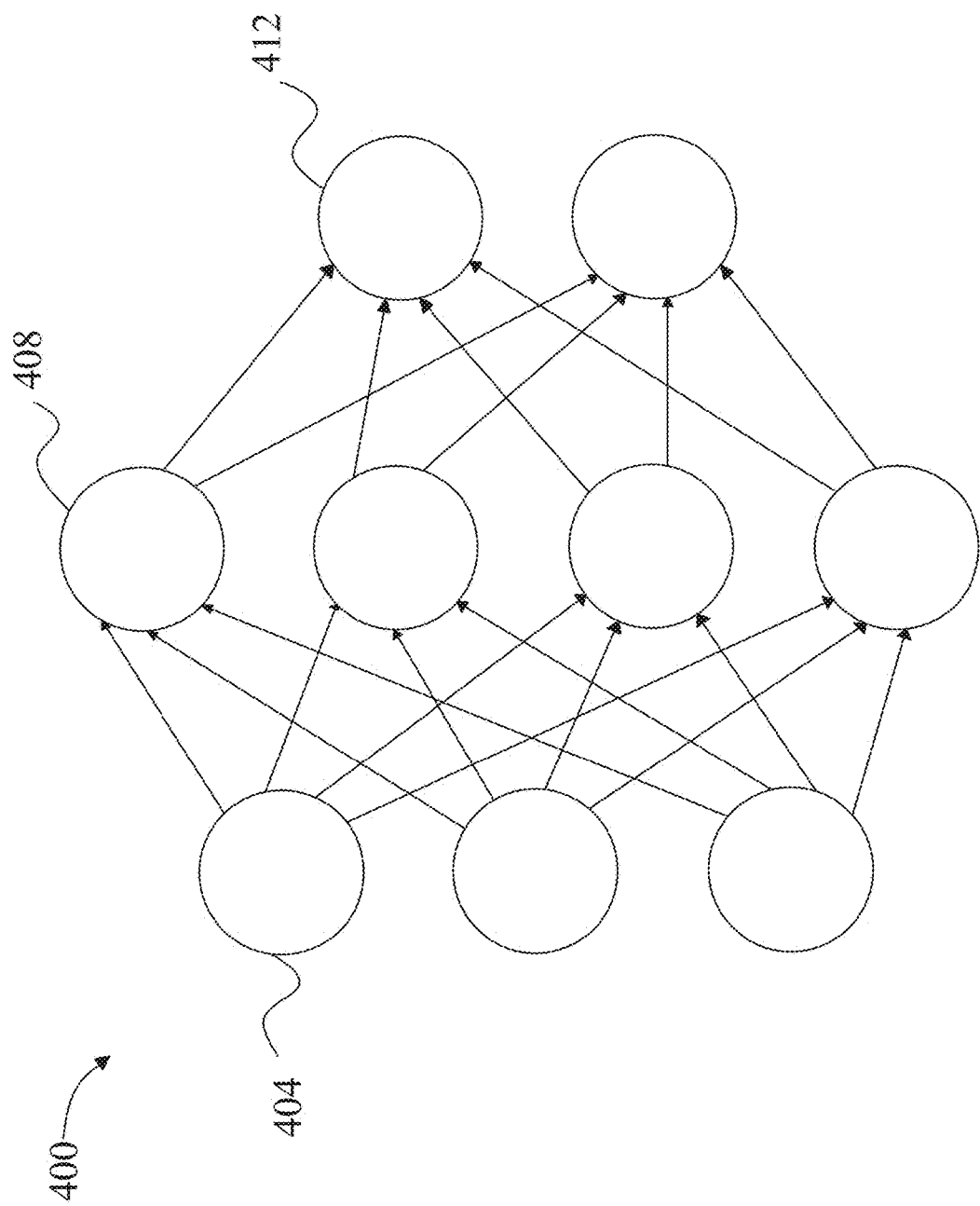
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
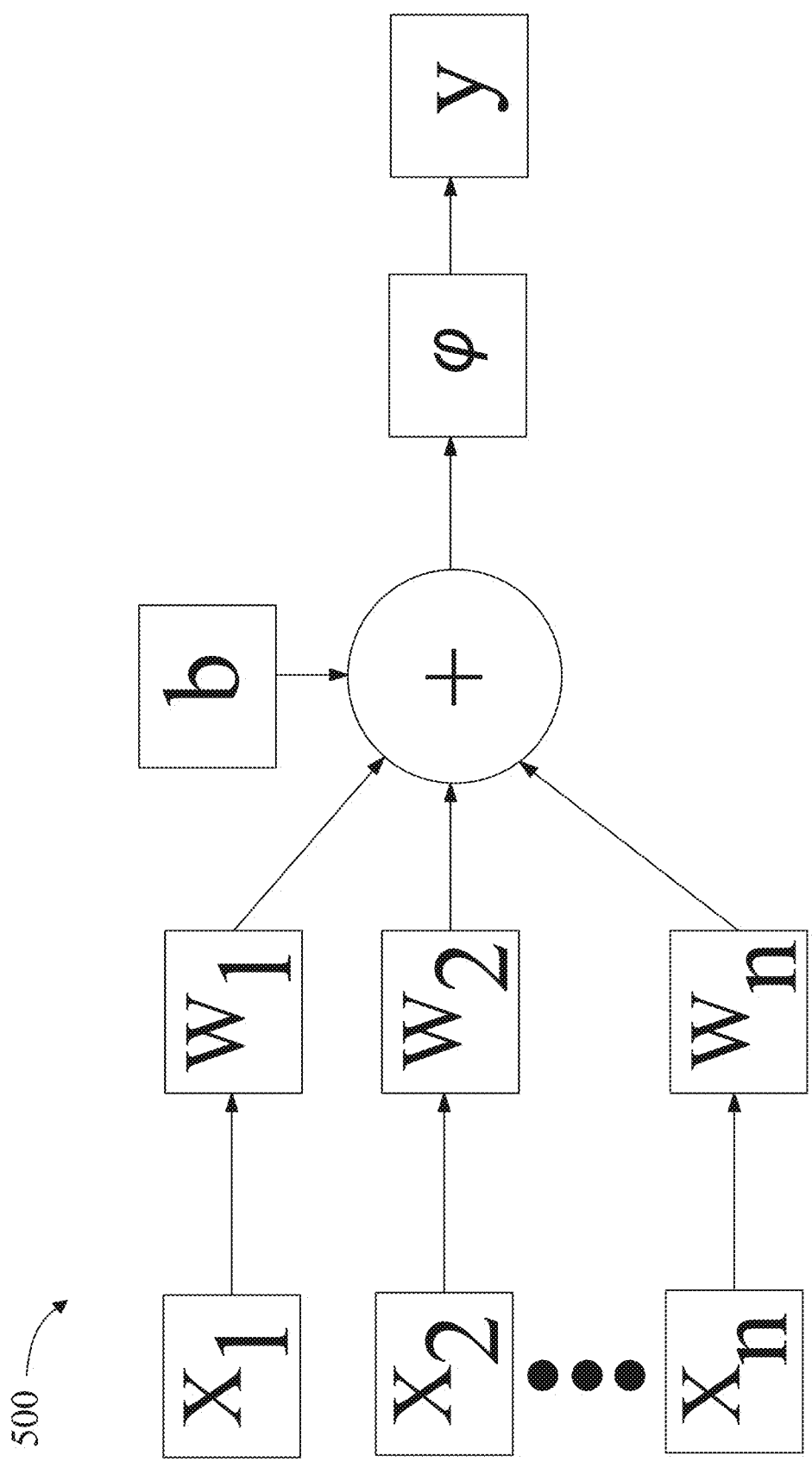
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit $$f(x) = \lambda \begin{cases} \alpha(e^x - 1) \text{ for } x < 0 \\ x \text{ for } x \geq 0 \end{cases}.$$

function such as Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
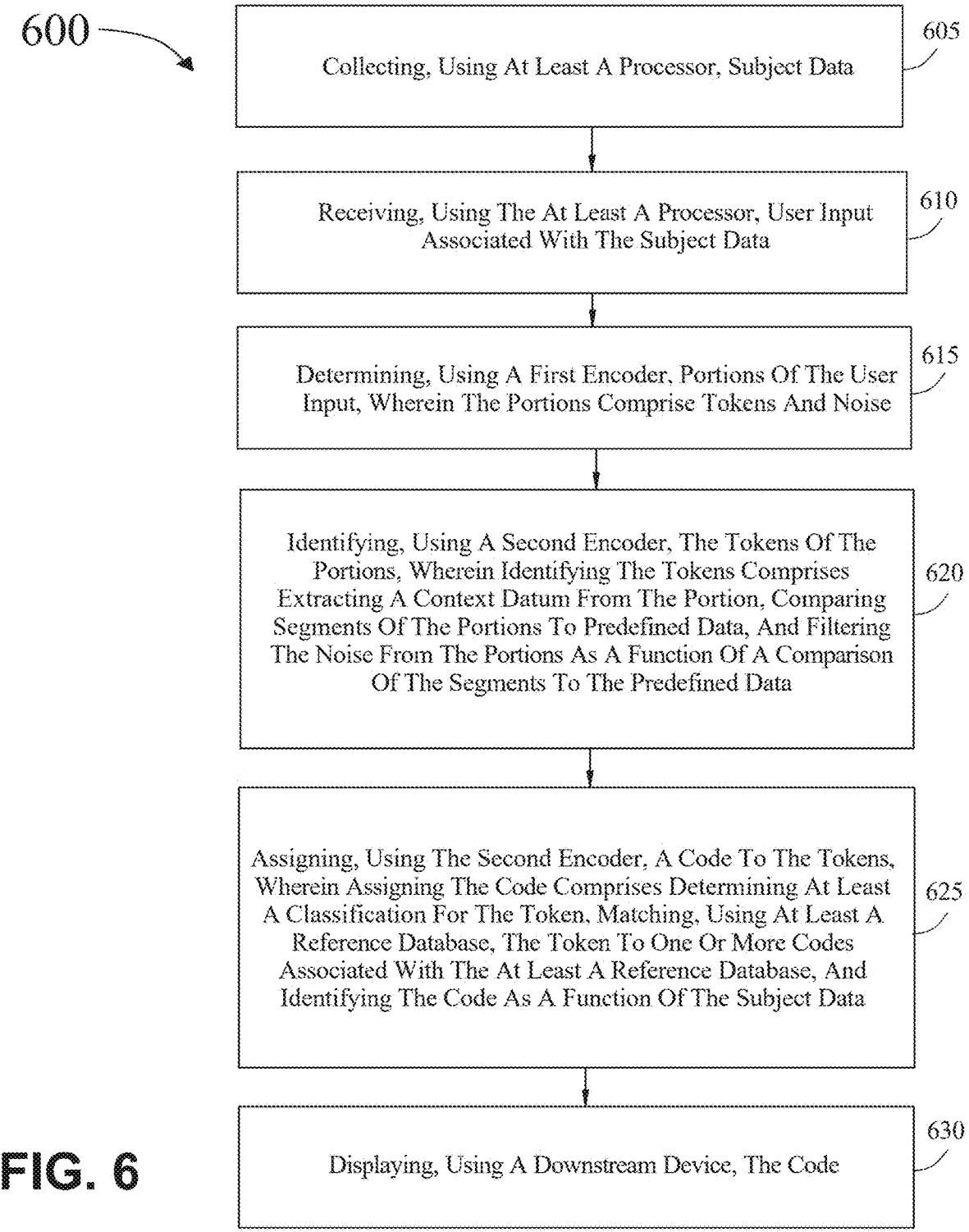
FIG. 6 is a block diagram of an exemplary method for determining a code as a function of subject data.

Referring now to FIG. 6, a flow diagram of an exemplary method 600 for determining a code as a function of subject data is illustrated. At step 605, method 600 includes collecting, using at least a processor, subject data. This may be implemented as described and with reference to FIGS. 1-5.

Still referring to FIG. 6, at step 610, method 600 includes receiving, using the at least a processor, user input associated with the subject data. In an embodiment, the apparatus may be configured to collect the subject data from electronic subject records. In an embodiment, the apparatus may further include a processing module configured to organize the subject data into predefined categories based on a temporal datum and filter the subject data based on a frequency datum. This may be implemented as described and with reference to FIGS. 1-5.

Still referring to FIG. 6, at step 615, method 600 includes determining, using a first encoder, portions of the user input, wherein the portions comprise tokens and noise. In an embodiment, the first encoder may include a natural language processor trained using a first dataset comprising historical portions corresponding to historical noise and historical tokens. This may be implemented as described and with reference to FIGS. 1-5.

Still referring to FIG. 6, at step 620, method 600 includes identifying, using a second encoder, the tokens of the portions, wherein identifying the tokens comprises extracting a context datum from the portions, comparing segments of the portions to predefined data, and filtering the noise from the portions as a function of a comparison of the segments to the predefined data. In an embodiment, the second encoder may include a large language model trained using a second dataset comprising historical tokens corresponding to historical code. In another embodiment, the second encoder may be iteratively trained using system feedback comprising a correction datum based on the user input. In an embodiment, identifying tokens of the user input may include detecting data elements that correspond to one or more codes associated with the at least a reference database. This may be implemented as described and with reference to FIGS. 1-5.

Still referring to FIG. 6, at step 625, method 600 includes assigning, using the second encoder, a code to the tokens, wherein assigning the code comprises determining at least a classification for the tokens, matching, using at least a reference database, the tokens to one or more codes associated with the at least a reference database, and identifying the code as a function of the subject data. In an embodiment, identifying the code as a function of the subject data may include analyzing context data of the user input, wherein identifying the code comprises comparing the context data of the user input to a key datum of the subject data. In an embodiment, the apparatus may be configured to assign the code based on a hierarchical system. In an embodiment, the hierarchical system may be configured to generate a probability score as a function of a confidence datum. This may be implemented as described and with reference to FIGS. 1-5.

Still referring to FIG. 6, at step 630, method 600 includes displaying, using a downstream device, the code. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
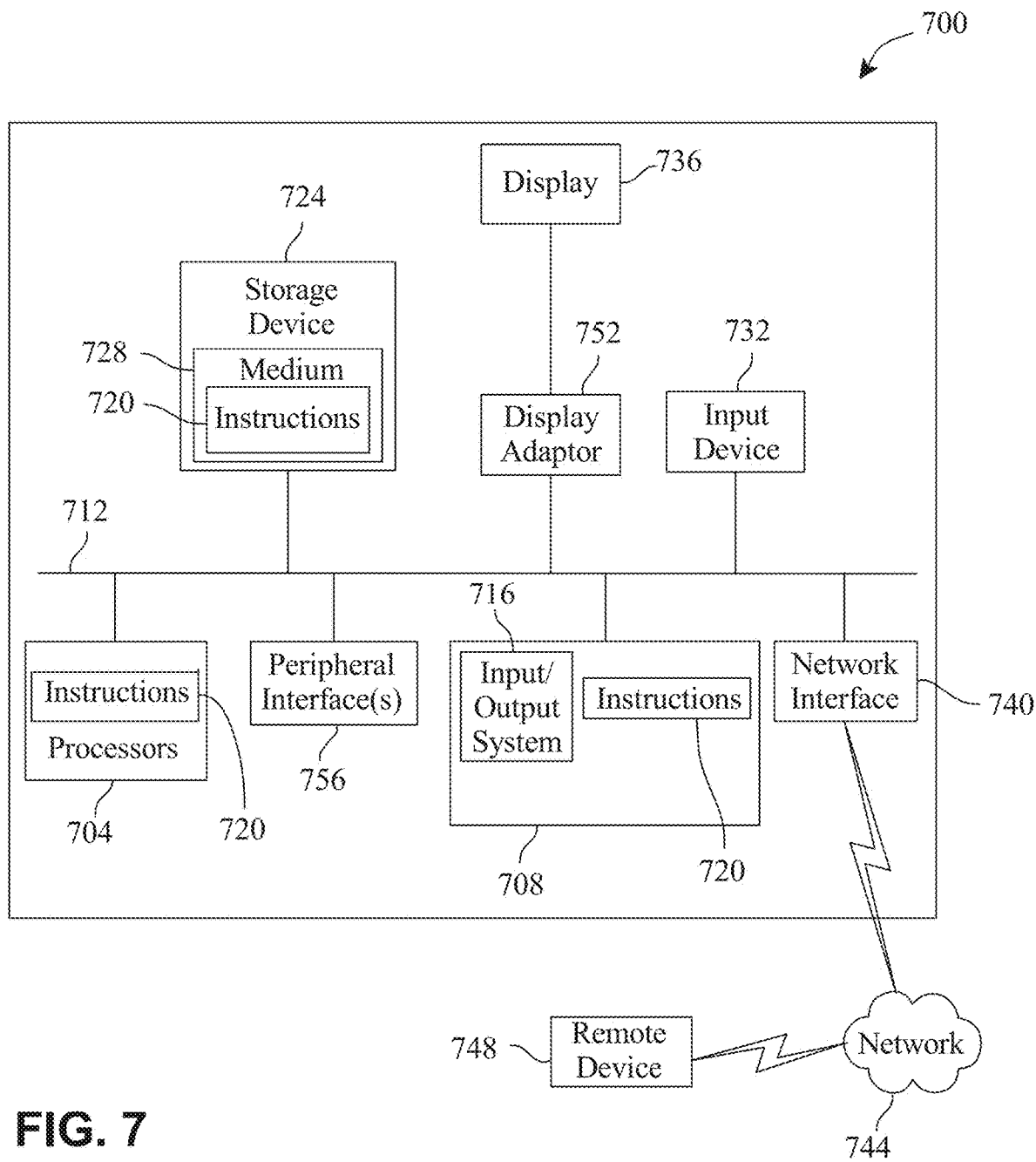
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a code as a function of subject data, wherein the apparatus comprises:
    at least a computing device, wherein the computing device comprises:
        a memory; and
        at least a processor communicatively connected to the memory, wherein the memory contains instructions configuring the at least a processor to:
            collect, using the at least a processor, subject data;
            receive, using the at least a processor, user input associated with the subject data;
            determine, using a first encoder, portions of the user input, wherein the portions comprise tokens and noise;
            identify, using a second encoder, the tokens of the portions, wherein identifying the tokens comprises:
                extracting a context datum from the portions;
                comparing segments of the portions to predefined data, wherein comparing the segments of the portions to the predefined data comprises using a cross-encoder by:
                    inputting, simultaneously, both the user input and the predefined into the cross-encoder;
                    assessing, by the cross-encoder, a degree of match between one or more segments of the portions of the user input and the predefined data by jointly encoding a combined context of the one or more segments and the predefined data based on at least the extracted context datum; and
                    producing, by the cross-encoder, a similarity score representative of the degree of match between the one or more segments of the user input and the predefined data;
filtering the noise from the portions as a function of a comparison of the segments to the predefined data based on the similarity score being within a range of values; and
identifying the tokens as a function of a comparison of the segments to the predefined data based on the similarity score not being within the range of values;
assign, using the second encoder, a code to the identified tokens, wherein the second encoder is iteratively trained using system feedback wherein the system feedback generates at least an error message as a function of an unexpected condition, wherein assigning the code comprises:
determining at least a classification for the tokens;
matching, using at least a reference database, the tokens to one or more codes associated with the at least a reference database; and
identifying the code as a function of the subject data; and
display, using a downstream device, the code.

2. The apparatus of claim 1, wherein the apparatus is further configured to collect the subject data from electronic subject records.

3. The apparatus of claim 1, wherein the first encoder comprises a natural language processor trained using a first dataset comprising historical portions corresponding to historical noise and historical tokens.

4. The apparatus of claim 1, wherein the second encoder comprises a large language model trained using a second dataset comprising historical tokens corresponding to historical code.

5. The apparatus of claim 1, wherein the second encoder is iteratively trained using system feedback comprising a correction datum based on the user input.

6. The apparatus of claim 1, wherein the apparatus further comprises a processing module configured to:
organize the subject data into predefined categories based on a temporal datum; and
filter the subject data based on a frequency datum.

7. The apparatus of claim 1, wherein identifying the tokens of the portions comprises detecting data elements that correspond to one or more codes associated with the at least a reference database.

8. The apparatus of claim 1, wherein identifying the code as a function of the subject data comprises analyzing context data of the user input, wherein identifying the code comprises comparing the context data of the user input to a key datum of the subject data.

9. The apparatus of claim 1, wherein the apparatus is further configured to assign the code based on a hierarchical system.

10. The apparatus of claim 9, wherein the hierarchical system is configured to generate a probability score as a function of a confidence datum.

11. A method for determining a code as a function of subject data, wherein the method comprises:
collecting, using at least a processor, subject data;
receiving, using the at least a processor, user input associated with the subject data;
determining, using a first encoder, portions of the user input, wherein the portions comprise tokens and noise;
identifying, using a second encoder, the tokens of the portions, wherein identifying the tokens comprises:
extracting a context datum from the portions;
comparing segments of the portions to predefined data, wherein comparing the segments of the portions to the predefined data comprises using a cross-encoder by:
inputting, simultaneously, both the user input and the predefined into the cross-encoder;
assessing, by the cross-encoder, a degree of match between one or more segments of the portions of the user input and the predefined data by jointly encoding a combined context of the one or more segments and the predefined data based on at least the extracted context datum; and
producing, by the cross-encoder, a similarity score representative of the degree of match between the one or more segments of the user input and the predefined data;
filtering the noise from the portions as a function of a comparison of the segments to the predefined data based on the similarity score being within a range of values; and
identifying the tokens as a function of a comparison of the segments to the predefined data based on the similarity score not being within the range of values;
assigning, using the second encoder, a code to the tokens, wherein the second encoder is iteratively trained using system feedback wherein the system feedback generates at least an error message as a function of an unexpected condition, wherein assigning the code comprises:
determining at least a classification for the tokens;
matching, using at least a reference database, the tokens to one or more codes associated with the at least a reference database; and
identifying the code as a function of the subject data; and
displaying, using a downstream device, the code.

12. The method of claim 11, wherein collecting the subject data comprises collecting the subject data from electronic subject records.

13. The method of claim 11, wherein the first encoder comprises a natural language processor trained using a first dataset comprising historical portions corresponding to historical noise and historical tokens.

14. The method of claim 11, wherein the second encoder comprises a large language model trained using a second dataset comprising historical tokens corresponding to historical code.

15. The method of claim 11, wherein the second encoder is iteratively trained using system feedback comprising a correction datum based on the user input.

16. The method of claim 11 further comprising:
organizing, using a processing module, the subject data into predefined categories based on a temporal datum; and
filtering, using the processing module, the subject data based on a frequency datum.

17. The method of claim 11, wherein identifying the tokens of the portions comprises detecting data elements that correspond to one or more codes associated with the at least a reference database.

18. The method of claim 11, wherein identifying the code as a function of the subject data comprises analyzing context data of the user input, wherein identifying the code comprises comparing the context data of the user input to a key datum of the subject data.

19. The method of claim 11, wherein assigning the code comprises assigning the code based on a hierarchical system.

20. The method of claim 19, wherein the hierarchical system is configured to generate a probability score as a function of a confidence datum.

* * * * *